(12) United States Patent
Quan

(10) Patent No.: US 7,539,465 B2
(45) Date of Patent: May 26, 2009

(54) TUNING AN RFID READER WITH ELECTRONIC SWITCHES

(75) Inventor: Ralph W. Quan, Broomfield, CO (US)

(73) Assignee: Assa Abloy AB, Stockholm (SE)

( * ) Notice: Subject to any disclaimer, the term of this patent is extended or adjusted under 35 U.S.C. 154(b) by 259 days.

(21) Appl. No.: 11/581,801

(22) Filed: Oct. 16, 2006

(65) Prior Publication Data

US 2008/0088415 A1 Apr. 17, 2008

(51) Int. Cl.
*H04B 1/04* (2006.01)
*H04B 7/00* (2006.01)

(52) U.S. Cl. .................. 455/121; 455/41.2; 455/123; 331/77

(58) Field of Classification Search .......... 331/74, 331/77; 455/41.2, 91, 119–121, 123
See application file for complete search history.

(56) References Cited

U.S. PATENT DOCUMENTS

| | | |
|---|---|---|
| 4,730,188 A | 3/1988 | Milheiser |
| 5,491,715 A | 2/1996 | Flaxl |
| 5,541,574 A | 7/1996 | Lowe et al. |
| 6,548,988 B2 | 4/2003 | Duff et al. |
| 6,650,227 B1 | 11/2003 | Bradin |
| 6,907,234 B2 | 6/2005 | Karr et al. |
| 7,132,946 B2 | 11/2006 | Waldner et al. |
| 2005/0219132 A1* | 10/2005 | Charrat .................. 343/745 |

OTHER PUBLICATIONS

Search report and Opinion for European Patent Application No. EP07118063, completed Jan. 30, 2008.
U.S. Appl. No. 11/387,755, unpublished, Andresky.
Office Action for European Application No. 07118063.2, mailed Dec. 9, 2008.

* cited by examiner

*Primary Examiner*—David Mis
(74) *Attorney, Agent, or Firm*—Sheridan Ross P.C.

(57) ABSTRACT

A reader for an RFID system includes a signal driver for generating an excitation signal and a resonant circuit having an adjustable resonant circuit capacitance for retuning the resonant circuit in response to detuning. The resonant circuit has a capacitance tuning circuit which includes a fine-tuning capacitor having a fine-tuning capacitance and a fine-tuning capacitor switch having an open position and a closed position. The fine-tuning capacitance is added to the adjustable resonant circuit capacitance when the fine-tuning capacitor switch is in the closed position and is removed from the adjustable resonant circuit capacitance when the fine-tuning capacitor switch is in the open position.

19 Claims, 4 Drawing Sheets

TUNING AN RFID READER WITH ELECTRONIC SWITCHES

TECHNICAL FIELD

The present invention relates generally to RFID systems, particularly to the construction and operation of a reader and associated transponder in an RFID system, and more particularly to the construction and operation of a reader having adjustable tuning capacitance to enhance the range of the reader for communication with the transponder.

BACKGROUND OF THE INVENTION

Radio frequency identification (RFID) systems typically include at least one reader and a plurality of transponders, which are commonly termed credentials, cards, tags, or the like. The transponder may be an active or passive radio frequency communication device which is directly attached to or embedded in an article to be identified or otherwise characterized by the reader. Alternatively, the transponder may be embedded in a portable substrate, such as a card or tag, carried by a person to be identified or otherwise characterized by the reader. An active transponder is powered up by its own internal power supply, such as a battery, which provides the operating power for the transponder circuitry. In contrast, a passive transponder is characterized as being dependent on the reader for its power. The reader "excites" or powers up the passive transponder by transmitting excitation signals of a given frequency into the space surrounding the reader, which are received by the transponder and provide the operating power for the circuitry of the recipient transponder.

Communication between the reader and transponder is enabled by cooperative resonant circuits which are provided in each reader and transponder. The resonant circuit of a reader typically includes an inductor and a capacitor. The capacitor is coupled in series between the inductor and a signal driver. The inductor is usually in the form of an antenna coil which is capable of magnetically coupling to an inductor in the resonant circuit of a compatible transponder through mutual inductance. Communication is initiated when a transponder is proximally positioned relative to the reader. The reader has a power supply which conveys a current to the reader resonant circuit causing the reader antenna to produce an excitation signal in the form of an electromagnetic field. The excitation signal couples to the antenna of the proximally-positioned transponder through mutual inductance and the excitation signal powers and clocks the transponder circuitry initiating operation of the transponder.

Transponder operation comprises generation of a response signal at a specified frequency and transmission of the resulting transponder response signal back to the reader. In particular, the transponder resonant circuit receives a current in response to the excitation signal which causes the transponder antenna to produce a response signal in the form of an electromagnetic field. The response signal couples to the reader antenna through mutual inductance in substantially the same manner as described above with respect to coupling of the excitation signal to the transponder antenna.

The transponder modulates the response signal to encode data stored in the memory of the transponder circuitry into the response signal. When the response signal couples to the reader antenna, a corresponding voltage is induced in the reader antenna at the specified frequency. The reader processes the induced voltage to read the data encoded in the response signal. The resulting data may be communicated to an output device, such as a display, printer, or storage device, and simultaneously, or alternatively, communicated to a host computer, if a host computer is networked into the RFID system.

An important operating parameter of the reader is the range of the reader when communicating with a transponder. The range of the reader is inter alia strongly affected by the strength of the electromagnetic field generated by the reader resonant circuit. In order to generate a field strength which provides the reader with adequate range, the designer of the reader must properly specify a resonant circuit which is appropriately tuned to a predetermined frequency for the desired application of the RFID system.

The range of the reader is often altered by the characteristics of the operating environment in which the reader resides. In a typical case where the reader is mounted in a fixed location on a support structure, the range of the reader is susceptible to the materials of the mounting location and other objects within the operating environment. For example, if the mounting location of the reader is in an operating environment which includes nearby metal, the metal can detune the resonant circuit of the reader from the predetermined frequency and dramatically reduce the range of the reader. The presence of one or more transponders in the operating environment of the reader which have variations in their respective resonant circuits due to imprecise manufacturing tolerances can detune the resonant circuit of the reader. Imprecise manufacturing tolerances in the resonant circuit of the reader can also detune the resonant circuit of the reader.

One means of overcoming the above-mentioned problems is to provide the reader resonant circuit with an adjustable tuning capability so that the tuning of the reader resonant circuit is adjusted in response to variations in its operating environment. As such, the present invention recognizes a need for a reader of an RFID system which is adaptable to variations in its operating environment. Accordingly, it is generally an object of the present invention to provide an RFID system having a reader which exhibits satisfactory performance characteristics while adjusting to variations in a given system operating environment. More particularly, it is an object of the present invention to provide a reader achieving a uniformly satisfactory level of performance when the reader is employed in different operating environments. It is another object of the present invention to provide a reader having a resonant circuit which automatically retunes itself to maintain a desired performance level in response to variations in the operating environment of the reader. These objects and others are accomplished in accordance with the invention described hereafter.

SUMMARY OF THE INVENTION

The present invention is a reader for an RFID system comprising a signal driver for generating an excitation signal and a resonant circuit having an adjustable resonant circuit capacitance for retuning the resonant circuit in response to detuning. The resonant circuit includes a capacitance tuning circuit and a transmitting antenna coupled with the capacitance tuning circuit for transmitting the excitation signal having a carrier frequency into a space surrounding the transmitting antenna. The capacitance tuning circuit includes a fine-tuning capacitor having a fine-tuning capacitance and a fine-tuning capacitor switch having an open position and a closed position. The fine-tuning capacitance is added to the adjustable resonant circuit capacitance when the fine-tuning capacitor switch is in the closed position and is removed from the adjustable resonant circuit capacitance when the fine-tuning capacitor switch is in the open position.

In another characterization of the invention, the capacitance tuning circuit includes a first fine-tuning capacitor having a first fine-tuning capacitance, a first fine-tuning capacitor switch having an open position and a closed position, a second fine-tuning capacitor having a second fine-tuning capacitance and a second fine-tuning capacitor switch having an open position and a closed position. The first fine-tuning capacitance is added to the adjustable resonant circuit capacitance when the first fine-tuning capacitor switch is in the closed position and is removed from the adjustable resonant circuit capacitance when the first fine-tuning capacitor switch is in the open position. The second fine-tuning capacitance is added to the adjustable resonant circuit capacitance when the second fine-tuning capacitor switch is in the closed position and is removed from the adjustable resonant circuit capacitance when the first fine-tuning capacitor switch is in the open position.

The capacitance tuning circuit preferably further includes a carrier frequency capacitor having a carrier frequency capacitance. The carrier frequency capacitance is added to the resonant frequency capacitance and the carrier frequency capacitor sets the carrier frequency of the excitation signal in cooperation with the transmitting antenna.

In another characterization of the invention, the capacitance tuning circuit includes a first carrier frequency capacitor having a first carrier frequency capacitance, a first carrier frequency capacitor switch having an open position and a closed position, a second carrier frequency capacitor having a second carrier frequency capacitance and a second carrier frequency capacitor switch having an open position and a closed position. A first excitation signal having a first carrier frequency is transmitted from the transmitting antenna when the first carrier frequency capacitor switch is in the closed position and the second carrier frequency capacitor switch is in the open position. A second excitation signal having a second carrier frequency is transmitted from the transmitting antenna when the first carrier frequency capacitor switch is in the open position and the second carrier frequency capacitor switch is in the closed position.

The present invention is also a method for tuning a reader for an RFID system. An excitation signal is generated in a signal driver. The excitation signal is conveyed to a resonant circuit having a capacitance tuning circuit and a transmitting antenna coupled with the capacitance tuning circuit. The excitation signal having a carrier frequency is transmitted into a space surrounding the transmitting antenna in the form of a magnetic field having a field strength. The resonant circuit is retuned to the carrier frequency in response to detuning by transitioning a fine-tuning capacitor switch from an open position to a closed position to add a fine-tuning capacitance of a fine-tuning capacitor coupled with the fine-tuning capacitor switch into the resonant circuit or by transitioning the fine-tuning capacitor switch from a closed position to an open position to remove the fine-tuning capacitance of the fine-tuning capacitor from the resonant circuit.

The present invention will be further understood from the drawings and the following detailed description.

Figure 1:
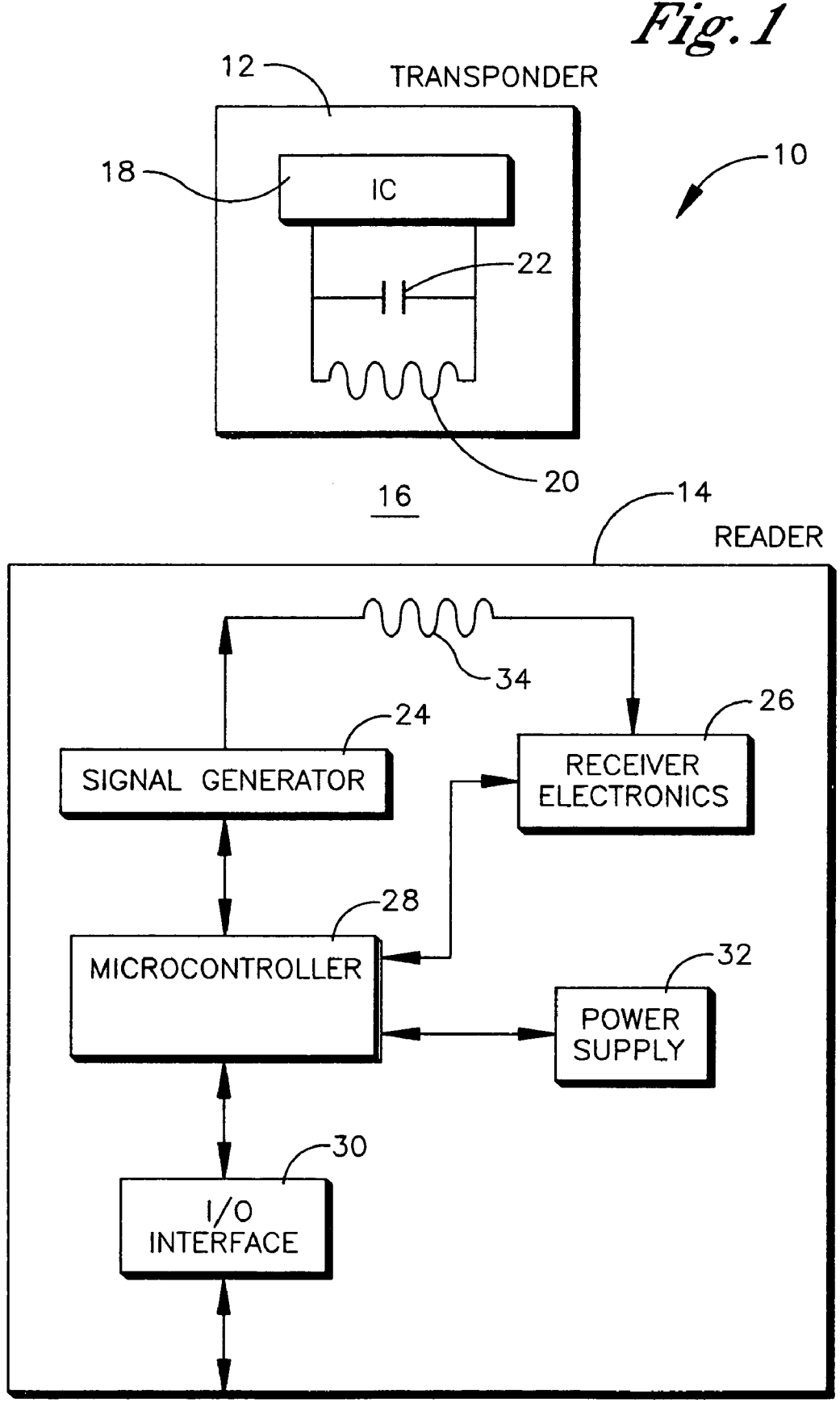
FIG. 1 is a block diagram of an RFID system employing a reader.

Embodiments of the invention are illustrated by way of example and not by way of limitation in the above-recited figures of the drawings, wherein like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

Referring initially to FIG. 1, a conceptualized embodiment of an RFID system is shown and generally designated 10. The RFID system 10 comprises a transponder 12 and a reader 14. The transponder 12 is preferably a passive device, which is not physically coupled with an electrical power supply. The electrical power required to operate the transponder 12 is indirectly supplied to the transponder 12 by electromagnetic waves, which are periodically propagated through open space 16 to the transponder 12 from the reader 14. The transponder 12 is only operational when it is receiving electromagnetic waves from the reader 14 of a specific frequency and of sufficient strength to power up the transponder 12.

The transponder 12 includes a transponder integrated circuit (IC) 18 and a transponder antenna 20 coupled with the transponder IC 18. The transponder antenna 20 is a single conventional coil which performs both the receiving and transmitting functions of the transponder 12. Thus, the transponder antenna 20 is termed a "dual-function antenna." However, the present invention is not limited to an RFID system having a transponder with a single dual-function transponder antenna. The present invention alternately encompasses an RFID system having a transponder with separate receiving and transmitting antennas, which separately perform the receiving and transmitting functions of the transponder.

The transponder IC 18 is preferably a custom IC which satisfies essentially all remaining required transponder functionalities, such as disclosed in U.S. Pat. No. 4,730,188 to Milheiser (the '188 patent) and U.S. Pat. No. 5,541,574 to Lowe et al. (the '574 patent), which are incorporated herein by reference. The transponder 12 optionally, but preferably, includes a transponder tuning capacitor 22 coupled with the transponder IC 18 and transponder antenna 20. The transponder antenna 20, in association with the transponder tuning capacitor 22, if present, define the transponder resonant circuit. The carrier frequency of the transponder 12 is determined by selecting an antenna and optionally a tuning capacitor for the transponder 12 tuned to the carrier frequency, which is typically either 125 kHz or 13.56 MHz.

It is understood that the present invention is not limited to any one specific type of transponder, but is generally applicable to most conventional types of transponders having utility in RFID systems. Thus, for example, the transponder 12 can be selected from proximity cards, proximity tags, smart cards, or the like. It is further understood that the RFID system 10 is not limited to RFID systems having only one transponder and one reader as shown. The present RFID system 10 is shown as such primarily for ease of description. In practice, RFID systems having utility in the present invention typically include any number of compatible transponders and can also include a plurality of compatible readers.

The reader 14 comprises a reader signal generator 24, reader receiver electronics 26, a reader microcontroller 28, a reader input/output (I/O) interface 30, a reader power supply 32, and a reader antenna 34. The reader power supply 32 is a finite electrical power source which is self-contained (i.e., internal) within the reader 14, such as a relatively small portable battery consisting of one or more disposable dry cells or rechargeable cells. Alternatively, the reader 14 is operable with a power supply which is hard wired to an essentially infinite remote electrical power source, such as an electric utility.

The reader signal generator 24 is coupled with the reader microcontroller 28 for generating relatively low energy electromagnetic waves termed "ring signals" or "detection signals" and for generating relatively high energy electromagnetic waves termed "excitation signals" under the direction of the reader microcontroller 28. The reader signal generator 24 is also coupled with the reader antenna 34 for transmitting the detection and excitation signals from the reader 14 through the open space 16 for reception by any nearby transponders which are tuned to the same frequency as the reader 14.

The detection and excitation signals transmitted from the reader 14 typically have a limited range due to size and power constraints of the reader 14. Thus, the reader 14 and transponder 12 of the RFID system 10 are simultaneously operational only when the transponder 12 is within the range of the reader 14 and, more particularly, when the reader 14 and transponder 12 are positioned in relative proximity to one another such that the transponder 12 receives excitation signals of sufficient strength and an appropriate frequency from the reader 14 to power up the transponder 12.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of the both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of the both the transponder and reader. In the case of a portable reader and a portable transponder, the user may move both the portable reader and the portable transponder into relative proximity with one another to enable simultaneous operation of the both the transponder and reader. The present invention is not limited to any one of the above-recited RFID system configurations.

The reader signal generator 24 initially operates in a transponder detection mode under the direction of the reader microcontroller 28. The transponder detection mode is a reduced power state of operation which is effected by periodically drawing reduced electrical current from the reader power supply 32 to the reader signal generator 24 which periodically generates detection signals containing analog data in response to the reduced electrical current. The detection signals, which are of insufficient strength to power operation of any transponders 12 residing in the open space 16 surrounding the reader 14, are periodically transmitted from the reader 14 and propagate into the open space 16. Propagated detection signals returned to the reader 14 via the reader antenna 34 are monitored and evaluated by the reader 14 when operating in the transponder detection mode.

The monitoring and evaluating functionalities are integrated into the reader microcontroller 28, which is preferably a single-chip device. The reader receiver electronics 26, like the reader signal generator 24, are coupled with the reader microcontroller 28 as well as with the reader antenna 34. FIG. 1 shows an embodiment of the reader circuitry where one end of the reader antenna 34 is coupled with the reader signal generator 24, while coupling the reader receiver electronics 26 with the other end of the reader antenna 34. It is alternately within the purview of the skilled artisan to couple the reader signal generator 24 and reader receiver electronics 26 with the same end of the reader antenna 34, thereby driving and receiving signals at the same end of the reader antenna 34. It is further within the scope of the present invention to couple the reader signal generator 24 with both ends of the reader antenna 34, while coupling the reader receiver electronics 26 with either one or both ends of the reader antenna 34. The present invention is not limited to any one of the above-recited antenna coupling configurations.

The transponder detection mode functionalities are enabled at least in part by specific software and/or firmware included in the reader microcontroller 28. The reader microcontroller 28 converts the analog data of the detection signals to digital data and identifies changes in degree and/or changes in kind within the digital data and further recognizes which changes in the digital data correspond to changes in one or more selected detection parameters, such as the decay rate or voltage of the detection signals. Changes in one or more of the selected detection parameters indicates the presence of a transponder 12 having a given frequency in the open space 16.

When the reader microcontroller 28 detects a transponder 12, it switches the reader signal generator 24 from the transponder detection mode to a transponder excitation mode at an increased power state of operation. Switching the reader signal generator 24 to the excitation mode terminates periodic generation of the detection signals of the given frequency and causes the reader signal generator 24 to draw increased electrical current from the reader power supply 32. The increased draw of electrical current in the excitation mode enables the reader signal generator 24 to generate an excitation signal of the given frequency under the direction of the reader microcontroller 28. The excitation signal is in the form of an electromagnetic wave, which has sufficient strength to power up the transponder 12. When the transponder 12 and/or reader 14 is moved to a proximal position such that the distance between reader 14 and transponder 12 is within the excitation signal reception range of the transponder antenna 20, the transponder antenna 20 receives the excitation signal at a sufficient strength to power up the transponder IC 18, thereby activating the transponder 12.

Upon activation, the transponder IC 18 generates a communication signal termed a transponder data signal, which contains readable information (i.e., digital data) copied or otherwise derived from the memory of the transponder IC 18. The transponder data signal is in the form of an electromagnetic wave like the excitation signal. The transponder 12 transmits the transponder data signal into the open space 16 of the external environment via the transponder antenna 20.

The reader antenna 34 as shown is a conventional coil acting as a single dual-function antenna, which performs both the receiving and transmitting functions of the reader 14. In particular, the reader antenna 34 receives the detection signals and the transponder data signals from the open space 16 and transmits the detection and excitation signals into the open space 16. However, the present invention is not limited to an RFID system having a reader with dual-function antennas. The present invention alternately encompasses an RFID system having a reader with separate receiving and transmitting antennas, which separately perform the transponder data signal and detection signal receiving functions of the reader and the detection signal and excitation signal transmitting functions of the reader, respectively. In yet another alternative, where a reader is provided with separate receiving and transmitting antennas, the reader transmitting antennas are capable of being adapted to act as dual-function antennas (i.e., receiving and transmitting) only with respect to the detection signals while the reader transmitting and receiving antennas function separately with respect to the transponder data signals.

Transponder data signal reading components and their corresponding functionality are integrated into the reader microcontroller 28 along with the transponder detection components and the components for activating the excitation mode and their corresponding functionalities described above. The transponder data signal reading functionalities are enabled in part by specific firmware included in the reader microcontroller 28. The receiver electronics 26 receive the transponder data signals for any of a plurality of data rates and modulation types, from the reader antenna 34 and "condition" the transponder data signals. The reader microcontroller 28 demodulates the conditioned transponder data signals in accordance with the respective modulation type of the signal to read the data on the signals. The resulting data can then be sent to an external device (not shown), such as a central host computer, via the reader I/O interface 30.

The reader signal generator 24 of the present invention is more particularly characterized as having a capacitance tuning circuit employing one or more capacitors and associated switches described hereafter. The capacitance tuning circuit is coupled with the reader antenna 34 and, in combination with the reader antenna 34, defines a reader resonant circuit having a tunable resonant frequency (i.e., tunable carrier frequency). A specific embodiment of a reader signal generator 24 having a capacitance tuning circuit 36 is shown and described hereafter with reference to FIG. 2. The capacitance tuning circuit 36 comprises a first parallel (or shunt) capacitor 38 having an associated first parallel (or shunt) capacitor switch 40, a second parallel (or shunt) capacitor 42 having an associated second parallel (or shunt) capacitor switch 44, a first series capacitor 45 having an associated first series capacitor switch 46, a second series capacitor 47 having an associated second series capacitor switch 48, and a third series capacitor 49 having an associated third series capacitor switch 50.

The reader signal generator 24 further comprises an AC signal source 54 and signal driver 56 which are functionally and structurally similar to those disclosed in the '188 and '574 patents. The AC signal source 54 and signal driver 56 are coupled in series with the capacitance tuning circuit 36, which is in turn coupled with the reader antenna 34. The reader antenna 34 in combination with the capacitance tuning circuit 36 are the reader resonant circuit 58. More particularly, the first, second and third series capacitors 45, 47, 49 are positioned upstream of the first and second parallel capacitors 38, 42 coupled between the signal driver 56 and the first and second parallel capacitors 38, 42. The first and second series capacitors 45, 47 are individually positioned in parallel relative to one another. The first and second parallel capacitors 38, 42 are coupled between the first and second series capacitors 45, 47 and the reader antenna 34. The first and second parallel capacitors 38, 42 are likewise individually positioned in parallel relative to one another.

Each capacitor switch 40, 44, 46, 48, 50 has an open position and a closed position and is selectively transitionable between the open position and the closed position under the control of a switch controller. When the first parallel capacitor switch 40 is in the closed position, it switches the entire capacitance of the first parallel capacitor 38 into the reader resonant circuit 58, thereby increasing the capacitance of the reader resonant circuit 58 in identical correspondence with the capacitance of the first parallel capacitor 38 (assuming a perfect or ideal switch). Similarly, when any of the remaining switches 44, 46, 48, or 50 is in the closed position, it switches the entire capacitance of the associated capacitor 42, 45, 47, or 49 into the reader resonant circuit 58, thereby increasing the capacitance of the reader resonant circuit 58 in identical correspondence with the capacitance of the associated capacitor 42, 45, 47, or 49 (assuming a perfect or ideal switch).

Conversely, when the first parallel capacitor switch 40 is in the open position, it switches the entire capacitance of the first parallel capacitor 38 out of the reader resonant circuit, thereby decreasing the capacitance of the reader resonant circuit 58 in identical correspondence with the capacitance of the first parallel capacitor 38 (assuming a perfect or ideal switch). Similarly, when any of the remaining switches 44, 46, 48, or 50 is in the open position, it switches the entire capacitance of the associated capacitor 42, 45, 47, or 49 out of the reader resonant circuit 58, thereby decreasing the capacitance of the reader resonant circuit 58 in identical correspondence with the capacitance of the associated capacitor 42, 45, 47, or 49 (assuming a perfect or ideal switch). Thus, for example, if a capacitor has a capacitance of 10 picofarads, a perfect associated capacitor switch would switch 10 picofarads into the resonant circuit 58 when in a closed position, but would switch 0 picofarads into the resonant circuit 58 when in an open position.

The capacitance tuning circuit 36 is commonly operated in a manner which maintains the strength of the magnetic field generated by the reader resonant circuit 58 at the reader antenna 34 at a maximum level for a given amount of voltage supplied to the reader resonant circuit 58, thereby maximizing the range of the reader 14. More particularly, the capacitance tuning circuit 36 is operated in accordance with the present invention such that the strength of the magnetic field generated by the reader resonant circuit 58 at the reader antenna 34 is maintained at a maximum level for a given amount of voltage in substantially all common operating cases, i.e., when no transponder is present in the range of the reader 14, when a single transponder is present in the range of the reader, or when multiple transponders are present in the range of the reader 14.

As a general rule, the magnetic field strength generated by the reader resonant circuit 58 and correspondingly the range of the reader 14 are both directly correlated to the inductance of the reader antenna 34. Accordingly, a reduction in the inductance of the reader antenna 34 for any reason undesirably alters the resonant frequency of the reader resonant circuit 58, which in turn decreases the magnetic field strength generated by the reader resonant circuit 58 and correspondingly decreases the range of the reader 14.

It has been found, however, that the above-recited undesirable effects, which occur when the inductance of the reader antenna 34 decreases, can be offset by increasing the capacitance of the reader resonant circuit 58. Accordingly, the practitioner increases the capacitance of the reader resonant circuit 58 in response to a decrease in the inductance of the reader antenna 34 in order to maintain a given resonant frequency, i.e., carrier frequency, thereby maintaining the magnetic field strength at the reader antenna 34 at or near a desired maximum during operation of the reader 14.

Detuning of the reader resonant circuit 58 can occur when aberrant environmental conditions, such as a proliferation of metal objects in the surrounding environment of the reader 14, decrease the effective inductance of the reader antenna 34. In general, the reader resonant circuit 58 is preferably retuned in response to such detuning by transitioning one or more capacitor switches in the capacitance tuning circuit 36 from an open position to a closed position or from a closed position to an open position, thereby adding or removing the capacitance contribution of the respective associated capacitor to or from the total capacitance of the reader resonant circuit 58.

In accordance with one embodiment, the reader antenna 34 is more particularly characterized as a dual-function, single frequency antenna because it performs both the receiving and transmitting functions of the reader resonant circuit 58, but only for a specific resonant frequency, i.e., typically either 125 kHz or 13.56 MHz. The first series capacitor 45 is more particularly characterized as a carrier frequency capacitor because it is selected by the designer of the capacitance tuning circuit 36 such that the first series capacitor 45, in cooperation with the reader antenna 34, sets the desired carrier frequency of the reader resonant circuit 58 subject to retuning in a manner described below. The second and third series capacitors 47, 49 and the first and second parallel capacitors 38, 42 are more particularly characterized as fine-tuning capacitors because they are selected by the designer of the capacitance tuning circuit 36 such that the capacitors 38, 42, 47, 49 in cooperation with their associated switches 40, 44, 48, 50, enable retuning of the reader resonant circuit 58 to restore the desired carrier frequency in response to detuning.

The design capacitances of the fine-tuning capacitors 38, 42, 47, 49 are preferably different from one another and are each preferably substantially less than the design capacitance of the carrier frequency capacitor 45. For example, the first series capacitor 45 may have a relatively high design capacitance to effect a resonant frequency of 125 kHz in the reader resonant circuit 58, while the fine-tuning capacitors 38, 42, 47, 49 have a relatively low design capacitance, thereby effecting only a relatively small tuning variance in the reader resonant circuit 58.

The present invention encompasses substantially any initial configuration of the capacitor switch positions in the reader resonant circuit 58 as long as at least the capacitor switch associated with the carrier frequency capacitor is in the closed position. For example, the capacitor switches of the reader resonant circuit 58 may be initially configured such that only the first series capacitor switch 46 is in an initial closed position while the remaining fine-tuning capacitor switches 40, 44, 48, 50 are in an initial open position. Accordingly, only the first series capacitor 45 contributes to the total capacitance of the reader resonant circuit 58 during initial operation of the reader 14, while none of the remaining fine-tuning capacitors 38, 42, 47, 49 contribute to the total capacitance of the reader resonant circuit 58 during initial operation. If the reader resonant circuit 58 becomes detuned during reader operation by a decrease in effective inductance due to certain environmental factors, the capacitance tuning circuit 36 transitions one, all, or any combination of the fine-tuning capacitor switches 40, 44, 48, 50 from the open position to the closed position to increase the capacitance of the reader resonant circuit 58 in correspondence with the capacitances of the one or more fine-tuning capacitors associated with the one or more closed fine-tuning capacitor switches. The particular one or more fine-tuning capacitor switches which are transitioned from the open to the closed position is a function of the level of increased capacitance needed. In any case, the resulting increased capacitance retunes the reader resonant circuit 58 to the desired carrier frequency and desirably maximizes the magnetic field strength at the reader antenna 34.

In some cases, it may be desirable to either increase or decrease the total capacitance of the reader resonant circuit 58 such as in certain cases where the reader resonant circuit 58 becomes detuned as a result of manufacturing variations in the reader resonant circuit 58 or in the resonant circuit of an associated transponder 12. In accordance with an alternate exemplary initial switch position configuration, which may apply to such cases, the reader resonant circuit 58 initially maintains the first series capacitor switch 46 in the closed position as in the above-recited exemplary switch position configuration. In accordance with the present configuration, however, the reader resonant circuit 58 also preferably initially maintains one or more of the remaining fine-tuning capacitor switches 40, 44, 48, 50 in the closed position. Accordingly, the carrier frequency capacitor and fine-tuning capacitors having associated capacitor switches in the initial closed position contribute to the total capacitance of the reader resonant circuit 58 during initial operation of the reader 14, while none of the remaining capacitors having associated capacitor switches in the initial open position contribute to the total capacitance of the reader resonant circuit 58.

If it is desired to decrease the capacitance of the reader resonant circuit 58 during reader operation, the capacitance tuning circuit 36 transitions one or more of the fine-tuning capacitor switches from the closed position to the open position depending on which of the one or more fine-tuning capacitor switches is in the initial closed position and depending on the desired level of decreased capacitance. Transitioning the fine-tuning capacitor switch from the closed position to the open position removes the capacitance contribution of the fine-tuning capacitor associated with the open switch from the total capacitance of the reader resonant circuit 58 for further operation of the reader 14.

It is apparent from the above, that the reader resonant circuit 58 can be retuned from substantially any initial or subsequent switch position configuration by selectively transitioning the fine-tuning capacitor switches between the open and closed positions to selectively add or remove the capacitance contribution of the respective associated fine-tuning capacitor. In a preferred embodiment, the reader microcontroller 28 preferably automatically sets the initial positions of the capacitor switches 40, 44, 46, 48, 50 in the capacitance tuning circuit 36. The reader microcontroller 28 subsequently automatically detects any detuning of the reader resonant circuit 58 and automatically controls transitioning of the switch positions in the manner recited above to retune the reader resonant circuit 58 and restore optimal operation of the reader 14. Accordingly, the resonant circuit 58 of the reader 14 is essentially self-tuning without requiring substantial user input.

In accordance with another embodiment, the reader antenna 34 is more particularly characterized as a dual-function, dual-frequency antenna because it performs both the receiving and transmitting functions of the reader resonant circuit 58 for two different selectable resonant frequencies. As in the above-recited embodiment, the first series capacitor 45 is characterized as a carrier frequency capacitor, and more particularly a first carrier frequency capacitor, because the first series capacitor 45, in cooperation with the reader antenna 34, sets a first selectable resonant frequency of the reader resonant circuit 58, e.g., 125 kHz. However, the second series capacitor 47 is also characterized as a carrier frequency capacitor, and more particularly a second carrier frequency capacitor, because when selectively operational to the exclusion of the first series capacitor 45 in a manner described below the second series capacitor 47, in cooperation with the reader antenna 34, sets a second selectable resonant frequency of the reader resonant circuit 58, e.g., 13.56 MHz. The third series capacitor 49 and first and second parallel capacitors 38, 42 remain fine-tuning capacitors as in the above-recited embodiment.

The capacitor switches of the reader resonant circuit 58 in the present embodiment are initially configured such that either the first or the second series capacitor switch 46, 48 is in an initial closed position while the other series capacitor switch is in an initial open position. The choice of which series capacitor switch is maintained in the closed position and which series capacitor switch is maintained in the open position depends on the desired carrier frequency of reader operation. For example, maintaining the first series capacitor switch 46 in the closed position and the second series capacitor switch 48 in the open position may effect a resonant frequency of 125 kHz in the reader resonant circuit 58. Conversely, maintaining the first series capacitor switch 46 in the open position and the second series capacitor switch 48 in the closed position may effect a resonant frequency of 13.56 MHz in the reader resonant circuit 58.

Once the initial positions of the first and second series capacitor switches 46, 48 are selected, the initial switch position configuration and operation of the remaining fine-tuning switches 40, 44, 50 is performed in substantially the same manner as described above to enable retuning of the reader resonant circuit 58 to whichever carrier frequency is selected at that time.

Each capacitor switch 40, 44, 46, 48, 50 of the capacitive tuning circuit 36 can be any one of a number of structural alternatives. In accordance with one alternative, each capacitor switch 40, 44, 46, 48, 50 is a mechanical switch having a manual switch control function. As such, the switch controller is in the form of a manually operated jumper, lever, push button, rotatable knob, slider, or the like. Alternatively, each capacitor switch 40, 44, 46, 48, 50 is a solenoid relay switch having an automated electronic switch control function. As such, the switch controller is preferably a microcontroller which may be functionally integrated into the reader microcontroller 28, in which case the switch controller is likewise structurally subsumed by the reader microcontroller 28. Although control of a solenoid relay switch is preferably effected electronically, the actual switch action is mechanical. A disadvantage of this is that the mechanical motion can cause the switch contacts to wear out over time. Solenoid relay switches also tend to be relatively large and are relatively noisy during operation.

A more preferred alternative capacitor switch 40, 44, 46, 48, 50 is a solid-state relay switch including a transistor. More specifically, the transistor is preferably a field effect transistor (FET), more specifically still, the transistor is preferably a metal oxide semiconductor field effect transistor (MOSFET), and more specifically yet, the transistor is preferably a power MOSFET. The switch control function of the solid-state relay switch, like the solenoid relay switch, is preferably integrated into the reader microcontroller 28. However, unlike the solenoid relay switch, the switch action of the solid-state relay switch itself is advantageously fully electronic.

Figure 3:
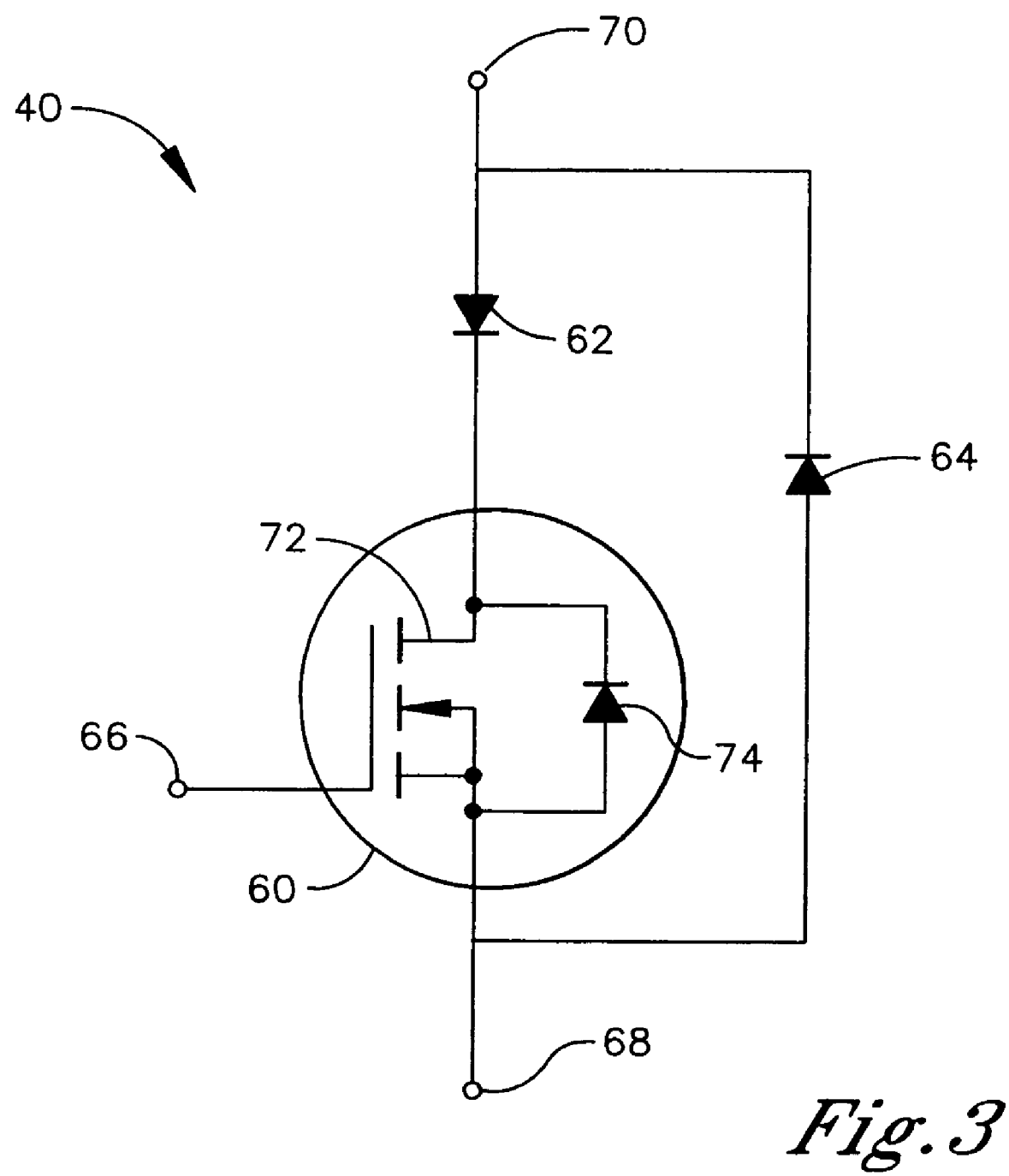
FIG. 3 is a schematic view of a solid-state relay switch employed in the capacitance tuning circuit of FIG. 2.

A preferred embodiment of a solid-state relay switch having utility as one, all, or some combination of the capacitor switches 40, 44, 46, 48, 50 is shown and described hereafter with reference to FIG. 3. Structural details of the capacitor switches 40, 44, 46, 48, 50 are described solely with reference to the first parallel capacitor switch 40, it being understood that the same description may apply likewise to each of the remaining capacitor switches 44, 46, 48, 50. The capacitor switch 40 comprises an N-channel power MOSFET 60, a first switching diode 62, a second switching diode 64 and first, second, and third switch terminals 66, 68, 70. The power MOSFET 60 includes a main portion 72 and a body diode 74.

The first switching diode 62 is positioned in series between the third switch terminal 70 and the power MOSFET 60 and is oriented in a direction opposite the directional orientation of the body diode 74 in the power MOSFET 60. The first switching diode 62 has a capacitance substantially lower than the capacitance of the power MOSFET 60, thereby substantially reducing the capacitance of the capacitor switch 40. The opposing orientations of the first switching diode 62 and body diode 74 prevent current from flowing through these two diodes 62, 74 between the second switch terminal 68 and the third switch terminal 70.

The second switching diode 64 is positioned in series between the second and third switch terminals 68, 70 and is positioned in parallel with the serially positioned first switching diode 62 and power MOSFET 60. The second switching diode 64 has the same directional orientation as the body diode 74 of the power MOSFET 60 and has the opposite directional orientation as the first switching diode 62. The second switching diode 64 allows current to flow through it from the second switch terminal 68 to the third switch terminal 70.

Current flow is allowed or prevented through the first switching diode 62 and power MOSFET 60 from the third switch terminal 70 to the second switch terminal 68 as a function of the control voltage at the first switch terminal 66. In particular, when the control voltage at the first switch terminal 66 is low enough, current flow is prevented through the first switching diode 62 and main portion 72 of the power MOSFET 60 from the third switch terminal 70 to the second switch terminal 68 (i.e., the capacitor switch 40 is open in that direction). However, as noted above, the second switching diode 64 still allows current to flow through it from the second switch terminal 68 to the third switch terminal 70 (i.e., the capacitor switch 40 is closed in that direction). Therefore, the capacitor switch 40 is open in one direction and closed in the other direction (i.e., the capacitor switch 40 is in an open/closed state) when the control voltage at the first switch terminal 66 is low enough. Positioning the capacitor switch 40 in series with the capacitor 38 while the capacitor switch 40 is in an open/closed state effectively keeps the capacitance of the capacitor 38 out of the reader resonant circuit 58 because of the alternating currents in the reader resonant circuit 58.

When the control voltage at the first switch terminal 66 is high enough, current flow is allowed through the first switching diode 62 and the main portion 72 of the power MOSFET 60 from the third switch terminal 70 to the second switch terminal 68 (i.e., the capacitor switch 40 is closed in that direction). The second switching diode 64 also allows current to flow from the second switch terminal 68 to the third switch terminal 70 (i.e., the capacitor switch 40 is closed in that direction as well). Therefore, the capacitor switch 40 is closed in both directions (i.e., the capacitor switch 40 is in a closed/closed state) when the control voltage at the first switch terminal 66 is high enough. Positioning the capacitor switch 40 in series with the capacitor 38 while the capacitor switch 40 is in a closed/closed state effectively connects the capacitor 38 to the reader resonant circuit 58 so that its capacitance is contributed to the reader resonant circuit 58.

The capacitor switch 40 is not an ideal switch since an ideal switch would allow current to flow in either direction when in the closed position, while preventing current flow in either direction when in the open position. Nevertheless, the capacitor switch 40 is an effective unidirectional open/bidirectional closed switch when used in the reader resonant circuit as taught herein. Another non-ideal aspect of the capacitor switch 40 is the small voltage drop (typically less than one volt) across the first and second switching diodes. This effect is negligible, however, since RFID readers in actual practice generally operate with at least ten volts across the parallel capacitors. It is further noted that the current preferably alternates direction at the carrier frequency of the reader in order to generate maximum strength magnetic fields at the reader antenna.

An alternate solid-state relay switch having utility as a capacitor switch is the power MOSFET 60 including the first, second, and third switch terminals 66, 68, 70, but absent the first and second switching diodes 62, 64. However, a power MOSFET by itself generally has more limited utility as a capacitor switch than the capacitor switch 40 shown in FIG. 3 because power MOSFETs may have capacitances which are too high for certain desirable low capacitance applications. For example, a power MOSFET having a capacitance on the order of about 100 picofarads would not be effective for switching a small capacitance, e.g., 10 picofarads, from a 10 picofarad parallel capacitor into the reader resonant circuit. When the power MOSFET is closed, its entire 10 picofarad capacitance is switched into the reader resonant circuit. However, when the power MOSFET is open, the effective capacitance of the 100 picofarad power MOSFET in series with the 10 picofarad capacitor, which is switched into the reader resonant circuit, is undesirably high as shown by the following equation: $(100 \times 10)/(100+10)=9.1$ picofarads. In contrast, the effective capacitance of a perfect switch would be 0 picofarads when in the open position. Therefore, the 100 picofarad power MOSFET would be a poor choice for a capacitor switch in this situation.

By comparison, combining the first and second switching diodes 62, 64, each having a low capacitance (e.g., about 1 picofarad), with the power MOSFET 60, as in the capacitor switch 40 of FIG. 3, substantially and desirably reduces the total capacitance between the second and third switch terminals 68, 70 in accordance with the following equation: $1+[(100 \times 1)/(100+1)]=1.99$ picofarads. Therefore, the capacitor switch 40 of FIG. 3 would be a good choice for a capacitor switch in this situation.

It is understood that the capacitance tuning circuit 36 is shown above by way of example rather than by way of limitation. Other capacitance tuning circuits having an alternate number and/or arrangement of capacitors and associated switches can be adapted by the skilled artisan for utility herein applying the present teaching and are within the scope of the present invention. Accordingly, capacitance tuning circuits having utility in the practice of the present invention are not limited to circuits having any specific number or arrangement of capacitors and associated switches. The skilled practitioner selects the number and arrangement of capacitors and associated switches for a particular capacitance tuning circuit interalia as a function of the carrier frequency, the desired magnetic field strength of the reader antenna and the desired range of tunability.

Figure 2:
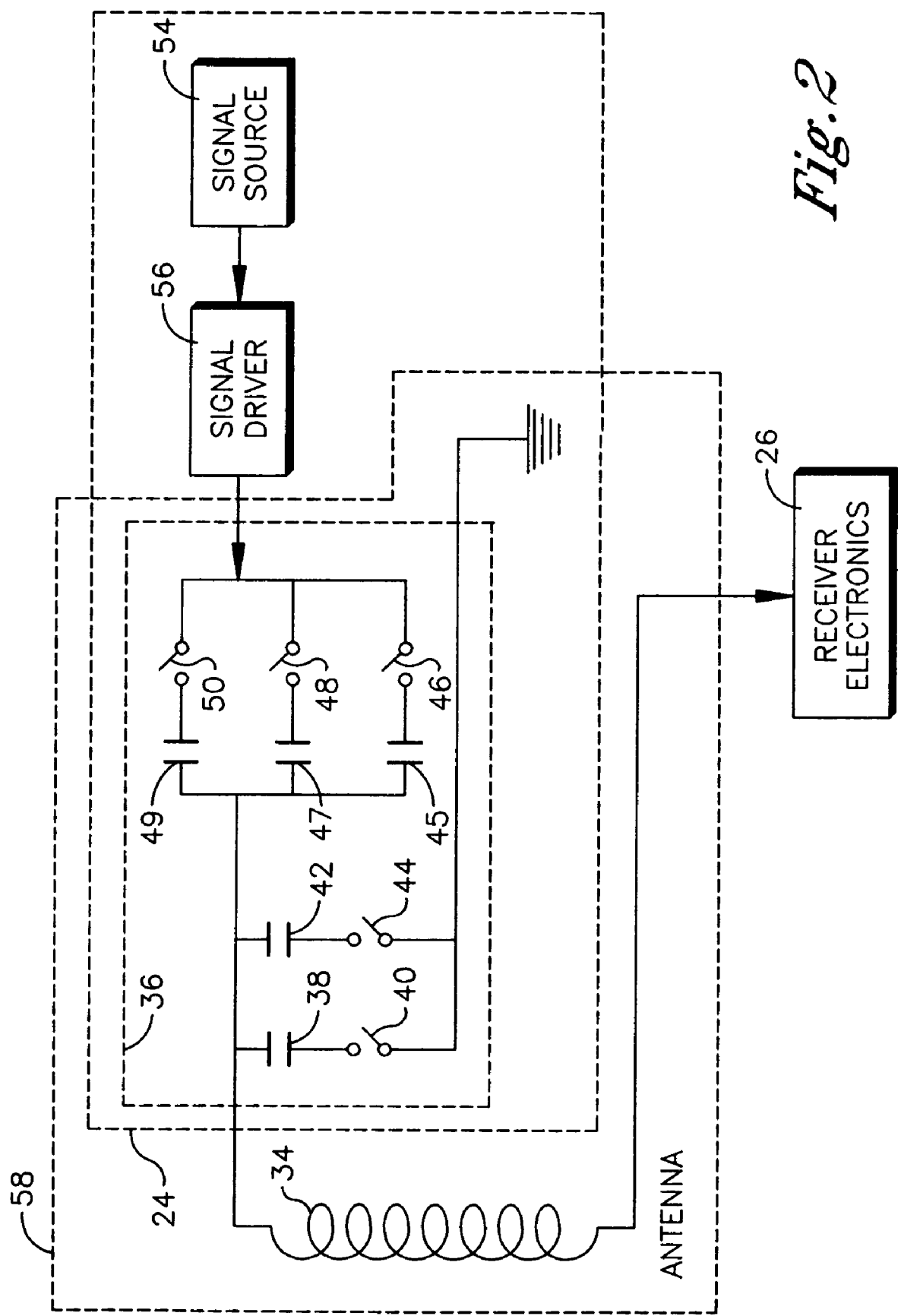
FIG. 2 is a schematic view of a reader signal generator including a capacitance tuning circuit having utility in the reader of FIG. 1.
Figure 4:
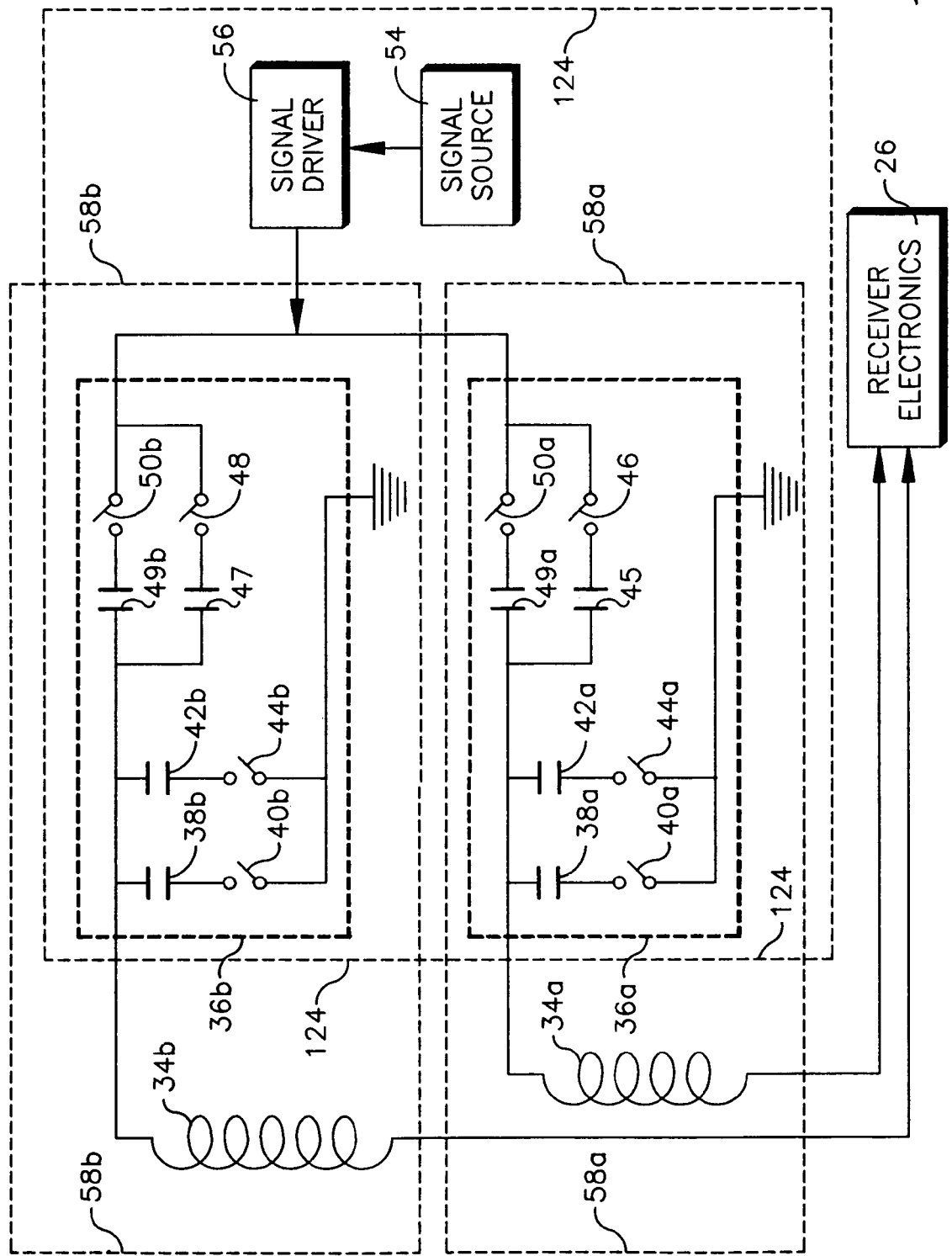
FIG. 4 is a schematic view of a reader signal generator including a pair of capacitance tuning circuits having utility in the reader of FIG. 1.

An alternate specific embodiment of a reader signal generator 124 having utility in the reader of FIG. 1 is shown and described hereafter with reference to FIG. 4. Elements of the reader signal generator 124 which correspond to essentially the same elements as described with reference to the reader signal generator 24 of FIG. 2 are designated by the same base reference number.

The reader signal generator 124 is similar in construction and operation to the reader signal generator 24, but has two distinct capacitance tuning circuits, each of which is associated with a separate dual-function, single-frequency antenna, to provide separate circuits for high and low carrier frequencies, respectively. In particular, a first capacitance tuning circuit 36a is coupled with a first reader antenna 34a to define a first reader resonant circuit 58a having a first resonant frequency (e.g., 125 kHz). A second capacitance tuning circuit 36b is coupled with a second reader antenna 34b to define a second reader resonant circuit 58b having a second resonant frequency (e.g., 13.56 MHz). Common elements of the first and second capacitance tuning circuits 36a, 36b are distinguished from one another by the appended letters "a" and "b", respectively.

The first capacitance tuning circuit 36a comprises a first parallel fine-tuning capacitor 38a having an associated first parallel fine-tuning capacitor switch 40a, a second parallel fine-tuning capacitor 42a having an associated second parallel fine-tuning capacitor switch 44a, a series fine-tuning capacitor 49a having an associated series fine-tuning capacitor switch 50a and a first carrier frequency capacitor 45 having an associated first carrier frequency capacitor switch 46. The second capacitance tuning circuit 36b similarly comprises a first parallel fine-tuning capacitor 38b having an associated first parallel fine-tuning capacitor switch 40b, a second parallel fine-tuning capacitor 42b having an associated second parallel fine-tuning capacitor switch 44b, a series fine-tuning capacitor 49b having an associated series fine-tuning capacitor switch 50b and a second carrier frequency capacitor 47 having an associated second carrier frequency capacitor switch 48. The capacitor switches 40a, 40b, 44a, 44b, 46, 48, 50a, 50b are preferably solid-state relay switches as described above with reference to FIG. 3.

The reader signal generator 124 further comprises an AC signal source 54 and signal driver 56. The AC signal source 54 and signal driver 56 are selectively coupled in series with either the first capacitance tuning circuit 36a or the second capacitance tuning circuit 36b. Selective coupling of the AC signal source 54 and signal driver 56 with the first capacitance tuning circuit 36a is effected by maintaining the series capacitor switch 46 in the closed position and maintaining the series capacitor switch 48 and series capacitor switch 50b in the open position to enable operation of the reader 14 at the first carrier frequency. Selective coupling of the AC signal source 54 and signal driver 56 with the second capacitance tuning circuit 36b is effected by maintaining the series capacitor switch 46 and series capacitor switch 50a in the open position and maintaining the series capacitor switch 48 in the closed position to enable operation of the reader 14 at the second carrier frequency.

Retuning the detuned first reader resonant circuit 58a is performed in substantially the same manner as described above with respect to the resonant circuit 58 of the reader signal generator 24 by transitioning one, all, or some combination of the first and second parallel capacitor switches 40a, 44a and serial capacitor switch 50a in the first capacitance tuning circuit 36a from an open position to a closed position or from a closed position to an open position, thereby adding or removing the capacitance contribution of the respective associated capacitors 38a, 42a, 49a to or from the total capacitance of the first reader resonant circuit 58a. Retuning the detuned second reader resonant circuit 58b is similarly performed by transitioning one, all, or some combination of the first and second parallel capacitor switches 40b, 44b and serial capacitor switch 50b in the second capacitance tuning circuit 36b from an open position to a closed position or from a closed position to an open position, thereby adding or removing the capacitance contribution of the respective associated parallel capacitors 38*b*, 42*b*, 49*b* to or from the total capacitance of the second reader resonant circuit 58*b*.

Although not shown, it is within the scope of the present invention to provide an alternate specific embodiment of a reader signal generator having utility in the reader of FIG. 1, wherein the reader signal generator 124 of FIG. 4 is modified to provide a separate dedicated signal source and/or driver for each of the first and second reader resonant circuits 58*a*, 58*b*.

While the forgoing preferred embodiments of the invention have been described and shown, it is understood that alternatives and modifications, such as those suggested and others, may be made thereto and fall within the scope of the invention.

I claim:

1. A reader for an RFID system comprising:
a signal driver for generating a first and second excitation signal, said first signal operating at a first carrier frequency of approximately 125 kHz and said second signal operating at a second carrier frequency of approximately 13.56 MHz; and
a resonant circuit coupled with said signal driver having a capacitance tuning circuit and a transmitting antenna coupled with said capacitance tuning circuit for transmitting one of said first excitation signal and said second excitation into a space proximate said transmitting antenna,
wherein said capacitance tuning circuit includes a fine-tuning capacitor having a fine-tuning capacitance and a fine-tuning capacitor switch having an open position and a closed position, further wherein said fine-tuning capacitor switch is a solid-state relay including a transistor.

2. The reader of claim 1, wherein said fine-tuning capacitor is a first fine-tuning capacitor, said fine-tuning capacitance is a first fine-tuning capacitance, and said fine-tuning capacitor switch is a first solid state-relay including a first transistor, further wherein said capacitance tuning circuit further includes a second fine-tuning capacitor having a second fine-tuning capacitance and a second fine-tuning capacitor switch having an open position and a closed position, wherein said second fine-tuning capacitor switch is a second solid-state relay including a second transistor.

3. A reader for an RFID system comprising:
a signal driver for generating a first and second excitation signal; and
a resonant circuit having an adjustable resonant circuit capacitance, said resonant circuit including a capacitance tuning circuit and a transmitting antenna coupled with said capacitance tuning circuit for transmitting one of said first excitation signal and said second excitation signal having a first and second carrier frequency, respectively, into a space surrounding said transmitting antenna, the first and second carrier frequencies corresponding to different radio frequency bands,
wherein said capacitance tuning circuit includes a fine-tuning capacitor having a fine-tuning capacitance and a fine-tuning capacitor switch having an open position and a closed position, wherein said fine-tuning capacitance is added to said adjustable resonant circuit capacitance when said fine-tuning capacitor switch is in said closed position and said fine-tuning capacitance is removed from said adjustable resonant circuit capacitance when said fine-tuning capacitor switch is in said open position.

4. The reader of claim 3, wherein said fine-tuning capacitor is a first fine-tuning capacitor, said fine-tuning capacitance is a first fine-tuning capacitance and said fine-tuning capacitor switch is a first fine-tuning capacitor switch, said capacitance tuning circuit further including a second fine-tuning capacitor having a second fine-tuning capacitance and a second fine-tuning capacitor switch having an open position and a closed position, wherein said second fine-tuning capacitance is added to said adjustable resonant circuit capacitance when said second fine-tuning capacitor switch is in said closed position and said second fine-tuning capacitance is removed from said adjustable resonant circuit capacitance when said second fine-tuning capacitor switch is in said open position.

5. The reader of claim 4, wherein said first fine-tuning capacitor is coupled in parallel with said second fine-tuning capacitor in said tuning capacitor circuit.

6. The reader of claim 3, wherein said capacitance tuning circuit further includes a carrier frequency capacitor having a carrier frequency capacitance, wherein said carrier frequency capacitance is added to said adjustable resonant frequency capacitance and said carrier frequency capacitor sets said first carrier frequency of said first excitation signal in cooperation with said transmitting antenna.

7. The reader of claim 6, wherein said carrier frequency capacitor is a first carrier frequency capacitor, and said carrier frequency capacitance is a first carrier frequency capacitance, said capacitance tuning circuit further including a first carrier frequency capacitor switch having an open position and a closed position, a second carrier frequency capacitor having a second carrier frequency capacitance, and a second carrier frequency capacitor switch having an open position and a closed position, wherein said first excitation signal having said first carrier frequency is transmitted from said transmitting antenna when said first carrier frequency capacitor switch is in said closed position and said second carrier frequency capacitor switch is in said open position and said second excitation signal having said second carrier frequency is transmitted from said transmitting antenna when said first carrier frequency capacitor switch is in said open position and said second carrier frequency capacitor switch is in said closed position.

8. The reader of claim 4, wherein said capacitance tuning circuit further includes a first carrier frequency capacitor having a first carrier frequency capacitance, a first carrier frequency capacitor switch having an open position and a closed position, a second carrier frequency capacitor having a second carrier frequency capacitance, and a second carrier frequency capacitor switch having an open position and a closed position, wherein said first excitation signal having said first carrier frequency is transmitted from said transmitting antenna when said first carrier frequency capacitor switch is in said closed position and said second carrier frequency capacitor switch is in said open position and said resonant circuit is retuned to said first carrier frequency in response to detuning by selectively transitioning said first and second capacitor switches between said open and closed positions while said first carrier frequency capacitor switch is in said closed position and said second carrier frequency capacitor switch is in said open position, further wherein said second excitation signal having said second carrier frequency is transmitted from said transmitting antenna when said first carrier frequency capacitor switch is in said open position and said second carrier frequency capacitor switch is in said closed position and said resonant circuit is retuned to said second carrier frequency in response to detuning by selectively transitioning said first and second fine-tuning capacitor switches between said open and closed positions while said first carrier frequency capacitor switch is in said open position and said second carrier frequency capacitor switch is in said closed position.

9. The reader of claim 3, wherein said fine-tuning capacitor switch is a solid-state relay including a transistor.

10. A reader for an RFID system comprising:
a signal driver for generating an excitation signal; and
a resonant circuit having an adjustable resonant circuit capacitance, said resonant circuit including a capacitance tuning circuit and a transmitting antenna coupled with said capacitance tuning circuit for transmitting said excitation signal having a carrier frequency into a space surrounding said transmitting antenna,
wherein said capacitance tuning circuit includes a fine-tuning capacitor having a fine-tuning capacitance and a fine-tuning capacitor switch having an open position and a closed position, wherein said fine-tuning capacitance is added to said adjustable resonant circuit capacitance when said fine-tuning capacitor switch is in said closed position and said fine-tuning capacitance is removed from said adjustable resonant circuit capacitance when said fine-tuning capacitor switch is in said open position, wherein said resonant circuit is a first resonant circuit, said capacitance tuning circuit is a first capacitance tuning circuit, said fine-tuning capacitor is a first fine-tuning capacitor, said fine-tuning capacitance is a first fine-tuning capacitance, said fine-tuning capacitor switch is a first fine-tuning capacitor switch, said transmitting antenna is a first transmitting antenna, said excitation signal is a first excitation signal, and said carrier frequency is a first carrier frequency, said reader further comprises a second resonant circuit coupled in parallel with said first resonant circuit and having an adjustable resonant circuit capacitance, said second resonant circuit including a second capacitance tuning circuit and a second transmitting antenna coupled with said second capacitance tuning circuit for transmitting a second excitation signal having a second carrier frequency into a space surrounding said second transmitting antenna in the form of a magnetic field having a field strength, wherein said second capacitance tuning circuit includes a second fine-tuning capacitor having a second fine-tuning capacitance and a second fine-tuning capacitor switch having an open position and a closed position.

11. The reader of claim 10, wherein said first capacitance tuning circuit further includes a first carrier frequency capacitor and a first carrier frequency capacitor switch having an open position and a closed position, said first carrier frequency capacitor having a first carrier frequency capacitance, further wherein said second capacitance tuning circuit farther includes a second carrier frequency capacitor and a second carrier frequency capacitor switch having an open position and a closed position, said second carrier frequency capacitor having a second carrier frequency capacitance.

12. The reader of claim 11, wherein said first excitation signal having said first carrier frequency is transmitted from said first transmitting antenna when said first carrier frequency capacitor switch is in said closed position and said second carrier frequency capacitor switch is in said open position and said first resonant circuit is retuned to said first carrier frequency in response to detuning by selectively transitioning said first fine-tuning capacitor switch between said open and closed positions while said first carrier frequency capacitor switch is in said closed position and said second carrier frequency capacitor switch is in said open position, further wherein said second excitation signal having said second carrier frequency is transmitted from said second transmitting antenna when said first carrier frequency capacitor switch is in said open position and said second carrier frequency capacitor switch is in said closed position and said second resonant circuit is retuned to said second carrier frequency in response to detuning by selectively transitioning said second fine-tuning capacitor switch between said open and closed positions while said first carrier frequency capacitor switch is in said open position and said second carrier frequency capacitor switch is in said closed position.

13. A reader for an RFID system comprising:
a signal driver for generating an excitation signal; and
a resonant circuit having a capacitance tuning circuit and a transmitting antenna coupled with said capacitance tuning circuit for transmitting said excitation signal having a carrier frequency into a space surrounding said transmitting antenna in the form of a magnetic field having a field strength,
wherein said capacitance tuning circuit includes a capacitor having a capacitance and a capacitor switch having an open position and a closed position, further wherein said capacitor switch is a solid-state relay including a field effect transistor, a first switching diode positioned in series with said field effect transistor, a second switching diode positioned in parallel with said first switching diode and said field effect transistor, a first switch terminal coupled with said field effect transistor, a second switch terminal and a third switch terminal, said second and third switch terminals parallely coupled with one another by a first parallel path including said field effect transistor and said first switching diode in series and by a second parallel path including said second switching diode.

14. A reader for an RFID system comprising:
a signal driver for generating a first and second excitation signal; and
a resonant circuit having a capacitance tuning circuit and a transmitting antenna coupled with said capacitance tuning circuit for transmitting one of said first excitation signal and said second excitation signal operating at first resonant frequency and second resonant frequency, respectively, into a space proximate said transmitting antenna in the form of a magnetic field having a field strength, wherein the first and second resonant frequencies are different by at least a factor of ten,
wherein said capacitance tuning circuit includes a first series fine-tuning capacitor having a first series fine-tuning capacitance, a first series fine-tuning capacitor switch having an open position and a closed position, a second series fine-tuning capacitor having a second series fine-tuning capacitance, and a second series fine-tuning capacitor switch having an open position and a closed position, wherein said first series fine-tuning capacitor contributes said first series fine-tuning capacitance to said resonant circuit when said first series fine-tuning capacitor switch is in said closed position and said second series fine-tuning capacitor contributes said second series fine-tuning capacitance to said resonant circuit when said second series fine-tuning capacitor switch is in said closed position.

15. The reader of claim 14, wherein either said first series fine-tuning capacitor switch, said second series fine-tuning capacitor switch or both are a solid-state relay including a transistor.

16. The reader of claim 15, wherein said transistor is a field effect transistor.

17. The reader of claim 15, wherein said transistor is a MOSFET.

18. A method for tuning a reader for an RFID system comprising:

generating a first excitation signal in a signal driver;

conveying said first excitation signal to a resonant circuit having a capacitance tuning circuit and a transmitting antenna coupled with said capacitance tuning circuit;

transmitting said first excitation signal having a first carrier frequency into a space surrounding said transmitting antenna in the form of a magnetic field having a field strength;

retuning said resonant circuit to said first carrier frequency in response to detuning by transitioning a capacitor switch from an open position to a closed position to add a fine-tuning capacitance of a fine-tuning capacitor coupled with said capacitor switch into said resonant circuit or by transitioning said capacitor switch from said closed position to said open position to remove said fine-tuning capacitance of said fine-tuning capacitor from said resonant circuit;

generating a second excitation signal in a signal driver;

conveying said second excitation signal to said resonant circuit; and transmitting said second excitation signal having a second carrier frequency into a space surrounding said transmitting antenna, wherein the first carrier frequency corresponds to about 125 kHz and the second carrier frequency corresponds to about 13.56 MHz.

19. The method of claim 18, wherein said capacitor switch is a solid-state relay including a transistor.

* * * * *